(12) United States Patent
Fusco

(10) Patent No.: US 6,627,022 B2
(45) Date of Patent: Sep. 30, 2003

(54) CONTINUOUS PROCESS FOR MANUFACTURING THERMOSET DECORATIVE PANELS

(76) Inventor: Luciano Fusco, Rua Coronel Diogo 982, Sao Paulo (BR)

( * ) Notice: Subject to any disclaimer, the term of this patent is extended or adjusted under 35 U.S.C. 154(b) by 0 days.

(21) Appl. No.: 09/739,345

(22) Filed: Dec. 19, 2000

(65) Prior Publication Data

US 2001/0055662 A1 Dec. 27, 2001

Related U.S. Application Data

(63) Continuation-in-part of application No. PCT/BR99/00035, filed on Jun. 19, 1998.

(30) Foreign Application Priority Data

Jun. 19, 1998 (BR) .............................................. 9802274

(51) Int. Cl.$^7$ .............................................. B32B 31/00
(52) U.S. Cl. ...................... 156/155; 156/243; 156/269; 156/273.3; 156/275.5; 156/277; 156/308.9; 156/307.4; 156/307.3; 264/132; 264/165; 264/145; 264/160
(58) Field of Search .................................. 156/155, 243, 156/244.19, 244.27, 269, 270, 273.3, 273.5, 275.5, 277, 380.9, 387, 500, 501, 307.4, 307.3; 264/132, 165, 145, 160

(56) References Cited

U.S. PATENT DOCUMENTS

| | | | |
|---|---|---|---|
| 4,113,894 A | 9/1978 | Koch, II | |
| 4,233,396 A | 11/1980 | Armstrong et al. | |
| 4,295,907 A | 10/1981 | Cordts et al. | |
| 5,518,569 A | 5/1996 | Achilles et al. | |

FOREIGN PATENT DOCUMENTS

BR 9403679-9 3/1996

*Primary Examiner*—Linda Gray
(74) *Attorney, Agent, or Firm*—Cantor Colburn LLP

(57) ABSTRACT

A continuous process for manufacturing decorative panels includes the steps of forming a first continuous fiber reinforced resin layer, laying a continuous decorated sheet on the first fiber reinforced resin layer, forming a second continuous fiber reinforced resin layer on the continuous decorated sheet, eliminating a substratum of the decorated sheet so that the first and second fiber reinforced resin layers can join one another to form a continuous consolidated strip of fiber reinforced resin with an image suspended therein, curing the continuous consolidated strip, and cutting a panel from the continuous consolidated strip. The first fiber reinforced resin layer is preferably at least partially cured in a first curing step before the second fiber reinforced resin layer is formed. It is also preferred to laminate the first fiber reinforced resin layer and decorated sheet in a first laminating step producing a first laminate and laminating the second fiber reinforced resin layer and the first laminate in a second laminating step before final curing.

20 Claims, 4 Drawing Sheets

CONTINUOUS PROCESS FOR MANUFACTURING THERMOSET DECORATIVE PANELS

CROSS-REFERENCE TO RELATED APPLICATION

This application is a continuation-in-part of International Application No. PCT/BR99/00035 having a priority date of Jun. 19, 1998.

BACKGROUND OF THE INVENTION

1. Field of the Invention

The present invention relates to a continuous process for manufacturing decorative panels and similar products used in decoration and visual communication. This process provide panels of very high quality, to fulfill the market segment that demands more sophisticated and aesthetically pleasing products.

2. Description of the Related Art

Manufacturing methods to obtain decorative reinforced plastic laminates are known from Canadian Patent No. 1,011,240 on behalf of Pidgeon, U.S. Pat. No. 4,126,719 on behalf of Koyanagi et al., and PCT Publication PI 9403679-9 on behalf of Fusco.

PCT Publication PI 9403679-9 discloses a continuous process for manufacturing decorative panels wherein a pair of fiber reinforced resin layers are formed on opposite sides of a decorated sheet and thermally cured in a single step.

A disadvantage of the foregoing process is that it involves thermal curing of unsaturated resins. It has been found that thermal curing of unsaturated resins is harmful to the final product quality because of shrinkage. The amount of shrinkage varies with the kind of resin, the curing temperature, the fillers added to the resin, and the kind of manufacturing process used, among other factors. In the case of continuous laminating for manufacturing products used for decoration and visual communication, the choice of the resin leaves very few alternatives.

In PCT Publication PI 9403679-9, the components of the continuous composite panel, that is, the two carrier/molding films, the two resin layers, the two reinforcement layers, and the decorated sheet, each have a different elongation coefficient. The difference in elongation coefficients can cause deformations, adversely affecting the quality of the final product. This is due to a combination of factors, such as stretching of the components when tensed during their transport through the long steps of the process, the frictional resistance of the laminate to sliding on the platform, the length of the platform, and the necessity to submit the composite panel to pultrusion.

Also, the presence of peroxide catalysts in the resin generates porosity in the laminate, and, moreover, doesn't allow the production line to be stopped for fittings, controls, material refill, production shifts, thereby making the operation very complex.

Another obstacle to obtaining a high quality product by an economically viable process using heating for curing the laminate, is the restriction in the choice of the decoration materials, both the substratum and the inks.

A further problem is the entrapping of air into the compound. It has been discovered that reinforced plastic laminates formed by the method disclosed in PCT Publication PI 9403679-9 often contain undesirable air bubbles, that are entrapped during process, especially when high production speed is pursued. Such air bubbles, even if of small dimensions, expand when exposed to the sun, damaging the appearance of the panel, harming the transparency, and causing delaminating between the layers.

The entrapping of air bubbles can dramatically worsen depending upon the way the decorated sheet and any upper molding film are introduced in the production line.

In PCT Publication PI 9403679-9 (FIG. 1) both the decorated sheet and a molding film are pulled from reels, sliding underneath respective guide axes or rollers, which are spaced apart from the composite so as to avoid contact with the sticky resin. The decorated sheet and molding film are laid by gravity, thereby entrapping air bubbles and forming barriers that hinder removal of the air bubbles by the laminating cylinders near the end of the production line.

A high quality, structural, reinforced plastic laminate, demands a high reinforcement content, to satisfy sophisticated applications requiring large seamless panels such as backlight facades in high buildings, elevated gas station signs or other applications where handling and installation of large panels is difficult, due at least in part to the panel's own weight.

Moreover, in a thermal curing process, the laminate can not reach its full cure in the production line, since it would demand impossible dimensions. To complete the curing at room temperature takes several days, keeping the laminate perfectly flat, otherwise any deformation becomes permanent.

There remains a need for high quality, structural panels for use in decoration and visual communication.

SUMMARY OF THE INVENTION

In view of all the limitations above mentioned, and to solve them, a new continuous manufacturing process was developed, comprising a series of interactive innovations that will be properly detailed in the description of the process, providing, as a final result, the following advantages:

I. In the process:
  easier operation because of the UV curing features and the elimination of the catalyst, allowing the operation to be switched on and off, again an again;
  higher operation speed (up to 30 meters per minute against approximately 5 meters per minute in the thermal curing process), dramatically increasing the productivity; and
  shorter curing area (from 30 meters to 1 m approximately).

II. In the product:
  perfect flatness, essential for visual communication and decoration panels;
  dimensional stability because of the full curing on the production line;
  homogeneity of the material due to elimination of the decorated sheet substratum by dispersion or removal;
  porosity free, because the peroxide catalyst elimination;
  high resistance/weight ratio due to the reinforcement content;
  air bubble free;
  economy in the product final cost (reference 30%, according to preliminary tests accomplished with production speed of 25 m/min); and
  long lasting performance.

A first aspect of the present invention is generally characterized in a continuous process for manufacturing decorative panels including the steps of forming a first continuous fiber reinforced resin layer, laying a continuous decorated sheet on the first fiber reinforced resin layer, forming a second continuous fiber reinforced resin layer on the continuous decorated sheet, eliminating a substratum of the decorated sheet so that the first and second fiber reinforced resin layers can join one another to form a continuous consolidated strip of fiber reinforced resin with an image suspended therein, curing the continuous consolidated strip, and cutting a panel from the continuous consolidated strip. The step of eliminating the substratum of the decorated sheet can be performed by alternately flexing the laminate to fragment or disintegrate the substratum, for example using a corrugated profiling mechanism, by dissolving the substratum, or by simply removing the substratum once the image printed thereon has transferred to the first fiber reinforced resin layer.

Another aspect of the present invention is generally characterized in a continuous process for manufacturing decorative panels including the steps of forming a first continuous fiber reinforced resin layer, laying a continuous decorated sheet on the first fiber reinforced resin layer, at least partially curing the first fiber reinforced resin layer with the decorated sheet thereon, forming a second continuous fiber reinforced resin layer on the continuous decorated sheet to create a continuous strip of panels, curing the second fiber reinforced resin layer, and cutting a panel from the continuous strip of panels. The first curing step can be performed using a thermal curing unit, a UV light source, or any other suitable type of curing unit. The final curing step is preferably performed using a UV light source but can be performed using any of the other curing units noted above.

Yet another aspect of the present invention is generally characterized in a continuous process for manufacturing decorative panels including the steps of forming a first continuous fiber reinforced resin layer, laying a continuous decorated sheet on the first fiber reinforced resin layer, laminating the first fiber reinforced resin layer and the decorated sheet to form a first laminate, forming a second continuous fiber reinforced resin layer on the first laminate, laminating the second fiber reinforced resin layer together with the first laminate to form a second laminate, curing the second laminate, and cutting a panel from the second laminate. Preferably, one or both of the laminating steps are performed by passing the panel components through sets of laminating cylinders. The decorated sheet is preferably fed directly into a set of laminating cylinders in the first laminating step to minimize entrapment of air bubbles in the composite.

Still another aspect of the present invention is generally characterized in a decorative panel comprising a decorated sheet disposed between first and second fiber reinforced resin layers, the decorated sheet including an image printed on a substratum that has been eliminated, the first and second fiber reinforced resin layers joining each other to form a consolidated structure without distinct layers. In a preferred embodiment, the substratum is in a fragmented or disintegrated condition and the fiber reinforced resin layers join each other through the substratum.

Yet another aspect of the continuous process proposed by this invention consists of forming two fiber-reinforced resin layers, catalyst free, one layer on each face of a continuous decorated sheet, so that such sheet is wet by the resin of the two layers, front and back, and that such two fiber-reinforced resin layers join each other through the sheet, becoming an only material. Such a continuous compound strip, set between two carrier/moulding films, is forced to pass, in sequence, through laminating cylinders and lamination/pultrusion mechanisms, through at least one UV radiation photocuring set, and finally, through cut and finishing set of the panels.

The panels so obtained consist in a laminate/pultruded constituted by two fibers-reinforced resin layer, formed one on each face of a decorated sheet, and the two fiber-reinforced resin layers are adequately consolidated and join each other through the decorated sheet, becoming an only material that produces decorative panels having a smooth, glass-like surface, free of deformations and porosity.

Layers of superficial finish can optionally be provided by the incorporation of a front and/or back film, by incorporation of a layer of gel-coat or by incorporation of a veil of polyester or the like.

The above and other features and advantages of the present invention will be further understood from the following description of the preferred embodiments thereof, taken in conjunction with the accompanying drawings.

BRIEF DESCRIPTION OF THE DRAWINGS

The enclosed drawings illustrate the basic concept of the continuous process for manufacturing thermoset decorative panels, wherein.

DETAILED DESCRIPTION OF THE PREFERRED EMBODIMENTS

According to the illustrations above, which are not intended to be restrictive regarding small possible variants, the purpose of the continuous manufacturing process of the present invention is the manufacturing of high quality panels (22) formed by resin (5) (11) reinforced with fibers (8) (13) integrated with a continuous decorated sheet (9), for use in visual communication and decoration, particularly in outdoor applications.

Figure 1:
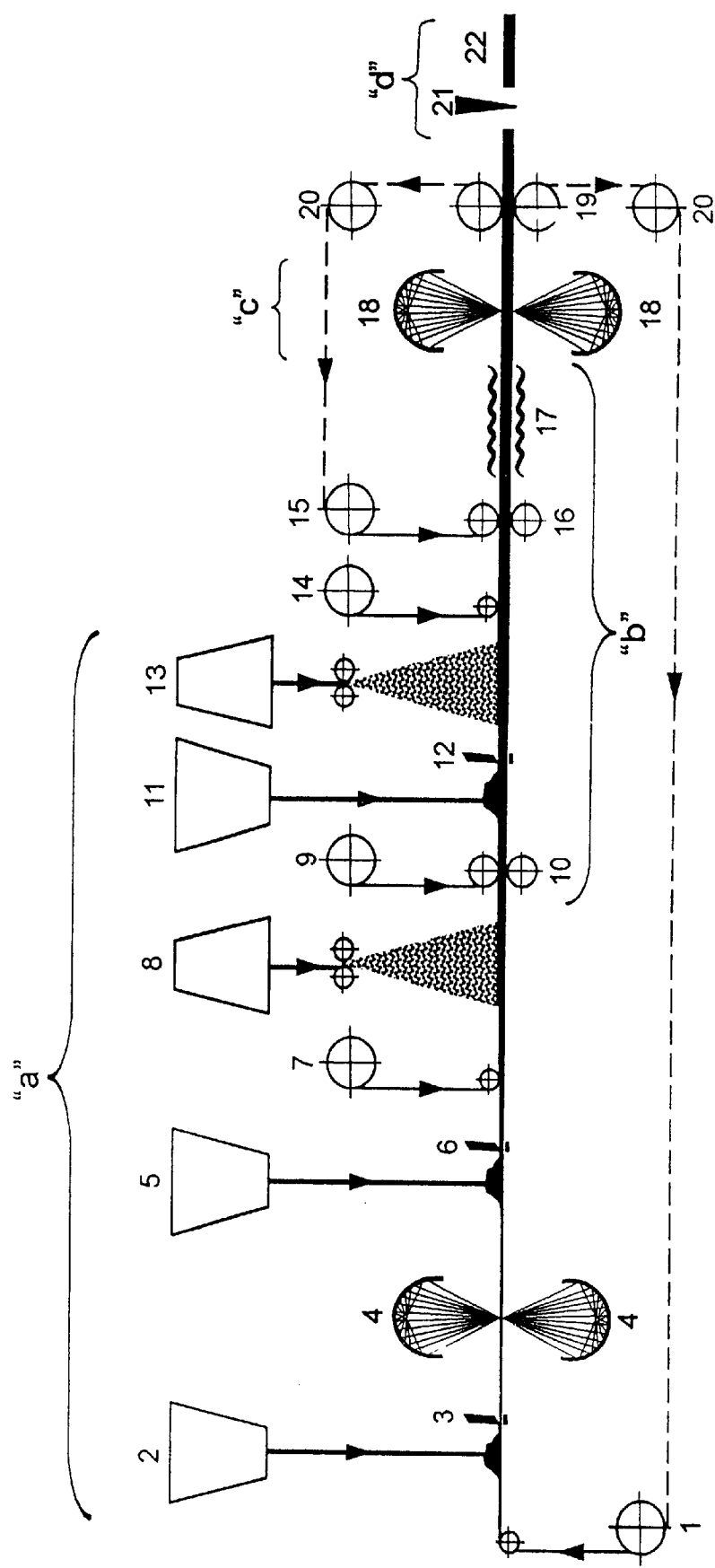
FIG. 1 shows a schematic view of a first embodiment of the manufacturing process according to the present invention.

A continuous process for manufacturing decorative panels according to a first embodiment of the present invention, illustrated in FIG. 1, includes the steps of introducing a continuous lower carrier film (1) on a flat platform; forming a first reinforced, unsaturated, UV-curable, thermosetting resin layer (5) (8) on the film (1); incorporating on the first layer a continuous decorated sheet (9) with one or more images printed thereon; laminating this first reinforced resin layer (5) (8) plus the decorated sheet (9) by passing the layer and the sheet through a first set of laminating cylinders (10), thereby obtaining a first laminate containing on its upper face the decorated sheet (9) properly permeated by the first layer resin; forming a second reinforced, unsaturated, UV-curable, thermosetting resin layer (11) (13) on the first laminate covering the decorated sheet (9); incorporating on this second layer an upper molding film (15); laminating the second reinforced resin layer (11) (13) plus the first laminate by passing the second layer and the first laminate through a second set of laminating cylinders (16) thereby obtaining a second laminate which contains the decorated sheet (9) inbetween the two reinforced resin layers (5) (8) and (11) (13) and contacted by the resin of the layers; pultrusion (16) (17) of the compound settled between the upper and lower films (1) and (15) to obtain the desired dimensional shape; profiling (17) the second laminate to eliminate the substratum of the decorated sheet (9) by causing the substratum to disintegrate and disperse in the second reinforced resin layer (11) (13); UV curing (18) of the continuous composite strip containing its complete cure in the production line; haul off (19) of the laminate sliding on the flat platform; and then cutting (21) the continuous strip into panels (22).

Gel-coating (2), fillers/veils (7) (14), films (1) (15), and other finishing layers may optionally be incorporated in the panel individually or in combination with one another.

Haul-off of the continuous composite can be accomplished using any suitable mechanism but is preferably achieved by a mechanism of wheels and cylinders (19) capable of providing advancing speeds of up to 30 m/min or more.

The production line is shown with an optional rewinding set (20) to permit rewinding of the carrier/molding films (1) (15).

The use of two sets of cylinders (10) (16) to perform the laminating in two separate and distinct steps provides better consolidation of the compound, with a substantial increase of the reinforcement content, by expelling the excess resin and optimizing the resistance/weight ratio of the component.

The entrapping of air bubbles inside the laminate is also solved by the present process, by modifying the way the decorated sheet (19) and the upper molding film (15) are fed, both being introduced directly in the laminating cylinders (10) (16), preventing any possibility of trapping the air during the incorporation, dismissing any removal operation.

The profiling mechanism (17) is shown as a corrugated double die pultrusion mold, arranged such that the corrugations are oriented crosswise relative to the direction of movement of the production line, forcing the passage of the continuous laminate through appropriate forms, where the laminate is repeatedly bent or flexed with alternate tensile and compressive effort on the sheet, making controlled microruptures in the structure of its substratum, without damaging the decorative image ink, which is chemically bonded to the first resin layer.

Once the composite is settled between the two molding films, it can be submitted to pultrusion, which involves passing the composite through defined gaps in the second group of laminating cylinders (16) after which it can be passed through the crosswise profiling double die mold (17) provided in the production line.

Figure 2:
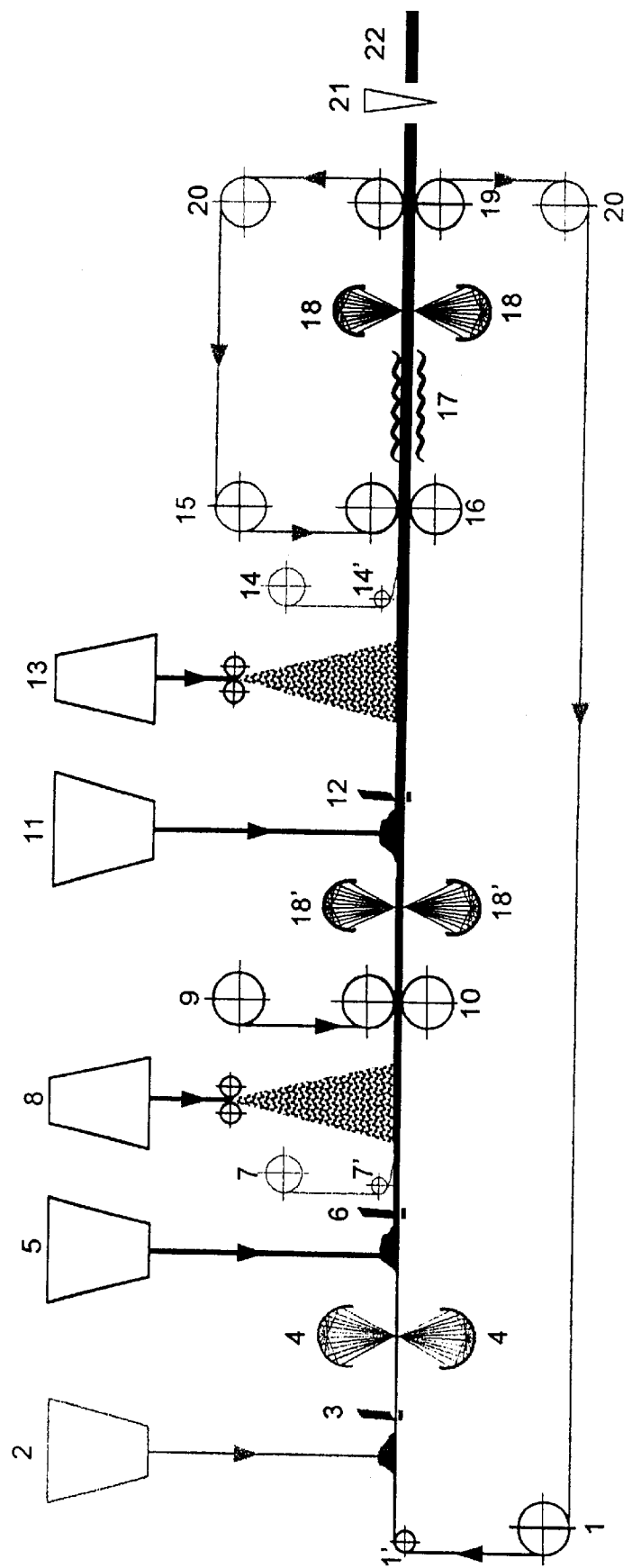
FIG. 2 shows a schematic view of a second embodiment of the manufacturing process according to the present invention.
Figure 3:
FIG. 3 shows a perspective view of a panel obtained by the process.
Figure 4:
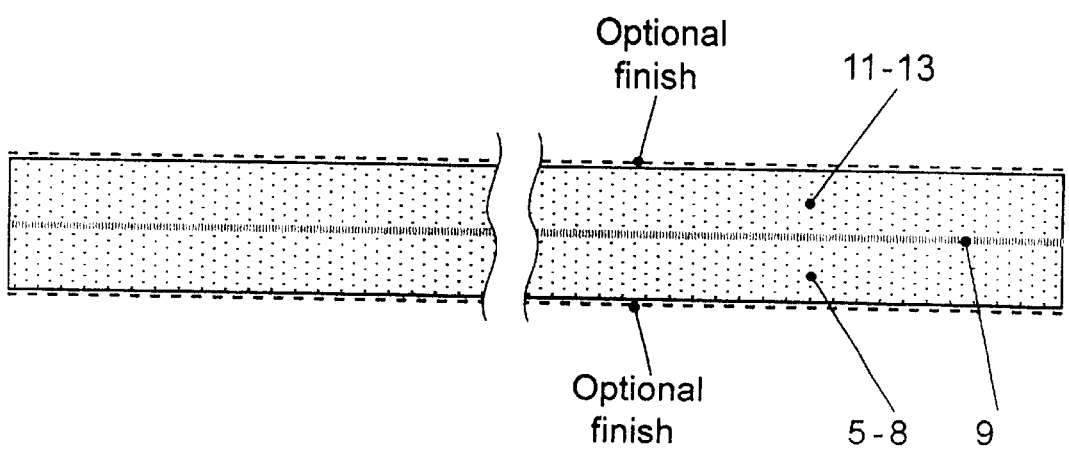
FIG. 4 shows a cross-section view of the panel taken through line 4—4 in FIG. 3.
Figure 5:
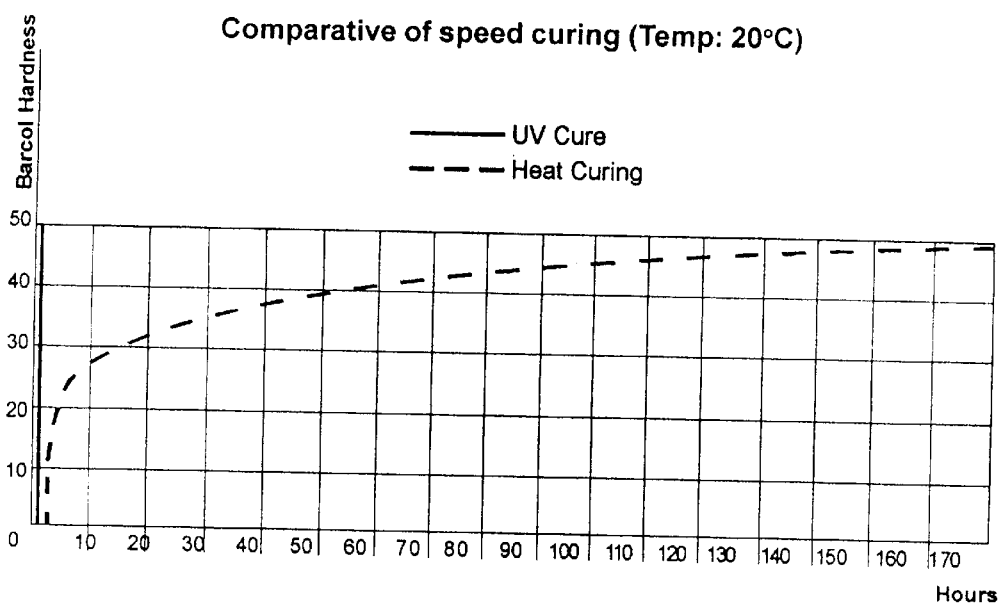
FIG. 5 shows a graph comparing the speed of the heat curing in PCT Publication PI 9403679-9 to the speed of UV curing in the process according to the present invention.
Figure 6:
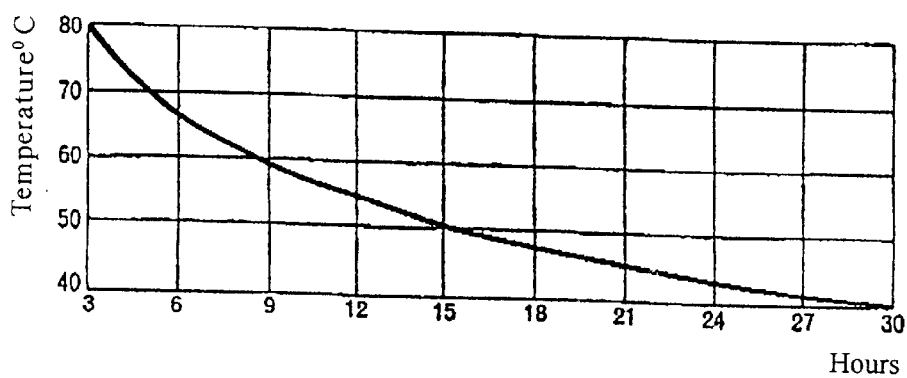
FIG. 6 shows a graph indicating temperature/time ratio for heat curing according to the process described in PCT Publication PI 940379-9.

In accordance with the present invention, one or more groups of curing sources can be placed in sequence both above and below the continuous composite at different stages in the process. For example, in FIG. 2, a modification of the manufacturing process is shown wherein all of the above mentioned steps are performed and, in addition, a first or initial UV curing source (18') is provided after the decorated sheet (9) is incorporated on the first fiber reinforced resin layer (5) (8), before the second fiber reinforced resin layer (11) (13) is formed.

The first curing source (18') can be any type of curing source capable of at least partially hardening the first laminate, however, it is preferred that the first curing source be a thermal or UV curing source. Moreover, by exposing the first layer to a first curing source (18'), the composite is irradiated in exactly the most difficult part to reach by the radiation, that is, the laminate core, creating favorable conditions for obtaining complete polymerization of the laminate in the second or final curing step of the production line.

By hardening the first layer with the first curing source (18') at the very beginning of the continuous production line, the first layer becomes self-carrying, with much more rigidity and stretching resistance than the carrier film. From this point on, the carrier film may in turn function merely as a lower molding film and, optionally, as a finishing protective film.

With this new set up, the stretching problems encountered in the technique described in the '679 publication are eliminated, thereby achieving a more perfect flatness of the product in the production line without any deformation.

It will also be appreciated that laminating in two separate and distinct steps facilitates curing the compound in two steps as follows:

a) laminating of the first reinforced resin layer (5) (8) plus the decorated sheet (9), wherein the decorated sheet passes to work, from its introduction in the production line in the lamination cylinders (10) on, as an intermediate upper molding film, providing that the substratum width must be the same width of the lamination cylinders, so as to not contaminate them with the sticky resin, regardless the size of the printed or decorated image, and, b) laminating of the second reinforced layer (11) (13), wherein the first layer laminated in a) and previously hardened by the first curing device (18'), passes to work, from this point on, as a self-carrying lower molding film, very much improving the process.

The homogeneity of the material is essential for a high quality panel destined to decoration and advertising especially outdoor. In a panel formed using the process described in the '679 publication, the decorated sheet itself was susceptible to peeling or delamination or splitting that diminished the useful life of the laminate. By way of contrast, the decorated sheet in the present invention is totally integrated with the external reinforcement layers eliminating or inducing the dispersion of the decorated sheet substratum in the second layer of the laminate, maintaining intact, inside the panel, the ink forming the decoration or advertising image, chemically bonded with the first resin (5).

In effect, the printed sheet functions as a vehicle to introduce the printed image (i.e., ink) inside of the laminate the sheet itself being afterward eliminated or dispersed in the resin of the subsequent layer.

The development herein becomes feasible because of the whole group of innovations introduced in the product and in the process, interacting one another, specially the fact of allowing the composite to resist pultrusion effort without deformation, due to the adequate stiffness of the first layer, previously hardened, working as a self-carrying molding support.

One finish improvement of the panels, can be made by optional veils/filler layers (7) (14).

Other finish improvement is provided by the lower/upper films (1) (15), which can optionally be chemically bondable to the laminate resin, becoming an integral and permanent part of it.

Other finish possibility is an optional gel-coat layer (2) provided before the first fiber reinforced resin layer (5) (8), comprising a UV partial curing set (4).

Immediately after the resin (5) (11) and, optionally, the gel-coat (2), calibration of these layers can be provided by doctor-blade devices (3) (6) (12).

In the continuous manufacturing process described above, the feed order, as well as some characteristics of the materials may be varied to produce panels of different constitutions, in order to fit special applications, as long as it always maintain the same technical effect that constitute the basic objective of the present invention.

The resin (5) (11) used in the process can be thermosetting or thermoplastic. The resin preferably belongs to the family of the polyester resins. The resin is preferably unsaturated, photosensitive, and can be colorless or translucent or pigmented according to the panel specifications. Other types of resins such as the vinilesters, epoxidics, melaminics, phenolics or combination of any of the above can also be selected. The resin may be selected to satisfy other requirements such as resistance to ageing, darkening, weathering, thermodeformation temperature, low contraction profile, mechanical/chemical resistance, low viscosity to facilitate the impregnation of the decorated material, etc. Low viscosity can be obtained in the formulation of the resin and/or by heating the resin before it is used.

The reinforcement material (8) (13) used in the process can be any material compatible with the resin, such as glass fiber or the like. The reinforcement material (8) (13) may be chosen to fulfill the requirements of translucity, resistance, compatibility with the resin, and cost. When fibers made of glass or the like are used as a reinforcement material, the fibers can be continuous strands that are chopped, chopped strands mats, woven roving fabrics, veils or used in some other form.

The decorated sheet (9) substratum must be permeable or compatible with the resin and suitable to be printed or stamped or decorated, with good image definition and resolution. The kind of decorated sheet (9) to be used depends on the characteristics of the panel to be produced. Natural or synthetic paper, tissue, cloth or fabric are preferable, though any material impregnable or compatible with the resin and suitable to be printed or stamped or somehow decorated, with good image definition and resolution, with legends, messages, decorations and others, in any colors, can be used as well. In the case of "backlight" panels, the decorated sheet will be selected to favor the diffusion of light with appropriate transmittancy.

The ink used to decorate the continuous sheet (9), should be compatible with the laminating resin. In addition, the inks are selected to fulfill such requirements as resistance and solidity to the light rays, particularly UV light, depending upon expected use and life expectancy needs of the panel, appropriate pigment concentration so as to print with low ink loads, and formulation avoiding any release of components such as silicons, waxes, etc.

The carrier/molding films (1) (15) are preferably transparent, UV permeable, brilliant, matte, textured, releasing or chemically bondable to be permanently integrated to the laminate. The carrier/moulding films (1) (15) are preferably of saturated polyester or similar and its surface can be, accordingly to the project specifications, brilliant, matte, texturized, releasing or chemically activated to be incorporated into the laminate and permeable to the UV light to allow curing of the laminate by radiation.

The process provides panels suitable for use outdoors as well as indoors. Thus, the panels can be used as outdoor advertisement, as signs, as decorative building elements, on vehicles and other similar applications.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed:

1. A continuous process for manufacturing decorative panels comprising the steps of: forming a first continuous fiber reinforced resin layer; laying a continuous decorated sheet on the first fiber reinforced resin layer, the decorated sheet including a continuous substratum with an image printed thereon; forming a second continuous fiber reinforced resin layer on the continuous decorated sheet; eliminating the substratum so that the first and second fiber reinforced resin layers can join one another to form a continuous consolidated strip of Fiber reinforced resin with the image suspended therein; curing the continuous consolidated strip; and cutting a panel from the continuous consolidated strip.

2. The process of claim 1 wherein said step of eliminating the substratum includes disintegrating the substratum.

3. The process of claim 2 wherein said step of disintegrating the substratum includes flexing the substratum after said decorated sheet has been laid upon the first fiber reinforced rosin layer.

4. The process of claim 3 wherein said step of flexing the substratum includes passing the decorated sheet with first and second fiber reinforced resin layers thereon through a corrugated profiling mechanism.

5. The process of claim 1 wherein said step of eliminating the substratum includes peeling the substratum from the first fiber reinforced resin layer before said step of forming the second fiber reinforced resin layer.

6. The process of claim 5 wherein said step of laying the continuous decorated sheet on the first fiber reinforced resin layer includes orienting the decorated sheet such that a side of the sheet upon which the image is printed faces the first resin layer.

7. The process of claim 1 and further comprising the step of at least partially curing the first fiber reinforced rosin layer prior to said step of eliminating the substratum so that the image is chemically bonded with the first fiber reinforced resin layer.

8. The process of claim 7 and further comprising the step of passing the first fiber reinforced resin layer and the decorated sheet through a laminating mechanism prior to said step of at least partially curing the first fiber reinforced resin layer.

9. The process of claim 1 and further comprising at least one of the steps of applying a continuous veil before the first fiber reinforced resin layer is formed and applying a continuous veil after the second fiber reinforced resin layer is formed.

10. A continuous process for manufacturing decorative panels comprising the steps of: forming a first continuous fiber reinforced resin layer; laying a continuous decorated sheet on the first fiber reinforced resin layer; at least partially curing the first fiber reinforced resin layer with the decorated sheet thereon; after at least partially curing the first fiber reinforced resin layer forming a second continuous fiber reinforced resin layer on the continuous decorated sheet to create a continuous strip of panels; curing the second fiber reinforced resin layer and any uncured first fiber reinforced resin layer; and cutting a panel from the continuous strip of panels.

11. The process of claim 10 further comprising, prior to said second curing step, the stop of laminating the continuous strip of panels.

12. The process of claim 11 further comprising, prior to said first curing step, the step of laminating the first fiber reinforced resin layer and the decorated sheet.

13. The process of claim 10 wherein the decorated sheet includes an image printed on a substrate, and further comprising the step of eliminating the substrate after the first curing stop so that the first and second fiber reinforced resin layers can join one another to form a continuous consolidated strip of fiber reinforced resin with the image suspended therein.

14. The process of claim 10 wherein said second curing step includes the step of using a UV light source to cure the second fiber reinforced resin layer.

15. The process of claim 14 wherein said first owing step includes the step of using a thermal curing unit to at least partially cure the first fiber reinforced resin layer.

16. The process of claim 14 wherein said first curing step includes the step of using a UV light source to at least partially cure the first fiber reinforced resin layer.

17. The process of claim 10 and further comprising at least one of the steps of applying a continuous veil before the first fiber reinforced resin layer is formed and applying a continuous veil after the second fiber reinforced resin layer is formed.

18. The process of claim 10 and further comprising laminating the first fiber reinforced resin layer and the decorated sheet to form a first laminate and laminating the second fiber reinforced resin layer together with the first laminate to form a second laminate.

19. The process of claim 18 wherein at least one of said laminating steps includes passing the decorated sheet and at least one fiber reinforced resin layer through a set of laminating cylinders.

20. The process of claim 19 wherein said step of laying the decorated sheet on the first fiber reinforced resin layer includes feeding the decorated sheet directly into a first set of laminating cylinders with the first fiber reinforced resin layer.

* * * * *